(12) United States Patent
Schran et al.

(10) Patent No.: US 7,840,652 B2
(45) Date of Patent: Nov. 23, 2010

(54) SYSTEM AND METHOD FOR DETERMINING NETWORK CONFIGURATION SETTINGS THAT PROVIDE OPTIMAL NETWORK PERFORMANCE

(75) Inventors: Adam R. Schran, Philadelphia, PA (US); Robert E. Darlington, Philadelphia, PA (US)

(73) Assignee: Ascentive LLC, Philadelphia, PA (US)

( * ) Notice: Subject to any disclaimer, the term of this patent is extended or adjusted under 35 U.S.C. 154(b) by 1253 days.

(21) Appl. No.: 10/078,815

(22) Filed: Feb. 19, 2002

(65) Prior Publication Data

US 2002/0138443 A1    Sep. 26, 2002

Related U.S. Application Data

(60) Provisional application No. 60/277,463, filed on Mar. 21, 2001.

(51) Int. Cl.
  *G06F 15/177*   (2006.01)
  *G06F 15/173*   (2006.01)
(52) U.S. Cl. ............... 709/220; 709/221; 709/223
(58) Field of Classification Search .......... 709/220, 709/221, 223, 233, 234, 235
  See application file for complete search history.

(56) References Cited

U.S. PATENT DOCUMENTS

| | | | |
|---|---|---|---|
| 6,189,008 B1 * | 2/2001 | Easty et al. | 707/10 |
| 6,292,483 B1 * | 9/2001 | Kerstein | 370/389 |
| 6,493,751 B1 * | 12/2002 | Tate et al. | 709/221 |
| 6,505,249 B1 * | 1/2003 | Rehkopf | 709/224 |
| 6,725,229 B2 * | 4/2004 | Majewski et al. | 707/102 |
| 6,842,431 B2 * | 1/2005 | Clarkson et al. | 370/254 |
| 7,222,255 B1 * | 5/2007 | Claessens et al. | 714/4 |

OTHER PUBLICATIONS

What's?com, "time-to-live," printout from web site address: http://whatis.techtarget.com/WhatIs_Definition_Page/0,4152,214184,00.html, printout date: Mar. 9, 2001 (2 pages).
What's?com, "latency," printout from web site address: http://whatis.techtarget.com/WhatIs_Definition_Page/0,4152,212456,00.html, printout date: Mar. 9, 2001 (1 page).
What's?com, "maximum transmission unit," printout from web site address: http://whatis.techtarget.com/WhatIs_Definition_Page/0,4152,213605,00.html, printout date: Mar. 9, 2001 (1 page).

(Continued)

*Primary Examiner*—Ario Etienne
*Assistant Examiner*—Avi Gold
(74) *Attorney, Agent, or Firm*—Panitch Schwarze Belisario & Nadel LLP

(57) ABSTRACT

A system and method determines network configuration settings that provide optimal network performance for a user's computer (client machine). The computer is connected to a remote server via a network connection. A plurality of network configuration settings are selected for the computer. One or more performance tests using the selected network configuration settings are automatically conducted. An algorithm is used to determine the best network configuration settings and achieve the desired network performance characteristics for the computer based on preferences specified by the user. The network configuration settings of the computer are automatically adjusted based on the results of the performance tests. The user's computer can access network configuration setting recommendations from the remote server, based on network configuration settings and aggregate test results associated with other computers that previously were in communication with the remote server.

56 Claims, 6 Drawing Sheets

OTHER PUBLICATIONS

"Ping times," printout from web site address: http://www.progressivesystems.com/Ping%20time.htm, printout date: Mar. 9, 2001 (1 page).

PCC Exclusives: 7th Annual Windows Superguide 98, "Speed Tricks: Faster to the Net," printout from web site address: http://www.zdnet.com/pccomp/features/excl1098/superguide/tips-speedl.html, printout date: Mar. 20, 2001 (1 page).

"Internet Connection Booster 2000 Version 3.5.0 (Final Release)," printout from web site address: http://toshi.50megs.com/icb2000/, printout date: Mar. 9, 2001 (5 pages).

ZDNet, "iSpeed for Windows v2.8.0 beta 4—Increase your Internet Speed," printout from web site address: http://www.zdnet.com/downloads/stories/info/0,,000R0B,.html, printout date: Mar. 9, 2001 (1 page).

"Accessing the Internet from Home with Windows 3.1," printout from web site address: http://server.uwindsor.ca:1101/comm/win31.html, printout date: Mar. 9, 2001 (11 pages).

Data Sheet, "Cisco Netsys Performance Service Manager," printout from web site address: http://cisco.com/warp/public/cc/pd/nemnsw/nesvmn/prodlit/pfmgr_ds.htm, printout date: Apr. 18, 2001 (9 pages).

Tweak HomePC, "An Explanation of how a Internet Download Works," printout from web site address: http://tweakhomepc.virtualave.net/modems/modemhow.html, printout date: Apr. 18, 2001 (14 pages).

* cited by examiner

| |
|---|
| Remote Client ID |
| Test ID (sequentially generated) |
| Connection Type (Modem, T1, DSL, etc.) |
| Network Settings |
| Test Results |

*Fig. 2*

| Group of Network Configuration Settings | Ping Time | Ping Time Percentage Score | Throughput | Throughput Percentage Score | Weighted Overall Percentage Score |
|---|---|---|---|---|---|
| G1 | 10 ms | 100% | 2000 kb/sec | 44% | 72% |
| G2 | 20 ms | 50% | 1500 kb/sec | 33% | 41.5% |
| G3 | 30 ms | 33% | 3000 kb/sec | 66% | 49.5% |
| G4 | 40 ms | 25% | 500 kb/sec | 11% | 18% |
| G5 | 50 ms | 20% | 4500 kb/sec | 100% | 60% |

*Fig. 4*

| Maximum Transmission Unit (MTU) | Scoring Result |
|---|---|
| 512 | 32% |
| 1024 | 57% |
| 2048 | 90% |
| 3072 | 27% |

Fig. 5

SYSTEM AND METHOD FOR DETERMINING NETWORK CONFIGURATION SETTINGS THAT PROVIDE OPTIMAL NETWORK PERFORMANCE

CROSS-REFERENCE TO RELATED APPLICATION

This application claims the benefit of U.S. Provisional Application No. 60/277,463, filed Mar. 21, 2001, entitled "SYSTEM AND METHOD FOR DETERMINING NETWORK CONFIGURATION SETTINGS THAT PROVIDE OPTIMAL NETWORK PERFORMANCE."

BACKGROUND OF THE INVENTION

Prior art software programs exist for adjusting and modifying various network configuration settings of a user's computer that are used by the Internet protocol (TCP/IP) running under Windows operating systems. Examples of such programs include webRocket®, available from Ascentive LLC; Internet Connection Booster 2000, available from BEVALLY Software, Inc., and iSpeed for Windows, available from High Mountain Software. These software programs allow a user to change various default settings, such as Maximum Transmission Unit (MTU), Maximum Segment Size (MSS), Receive Window (RWIN), Time to Live (TTL), MTU Auto Discover, and Black Hole detection. The user may change the settings manually, or the user may select a group of settings that are defined by the software program. The goal of changing the settings is to optimize the performance of the user's computer. Manually trying to identify optimal settings is a time-consuming and difficult trial-and-error process. Once a particular group of settings is identified, the settings may not even be optimized for subsequent Internet sessions. Changing the default settings to a predefined group of settings may provide some improvement in performance, but does not provide the optimal settings for a particular user's computer during a particular Internet session.

Furthermore, the user may have specific performance preferences. For example, one user may prefer enhanced download speed, while another may prefer a system with minimized latency. It may be difficult, if not impossible, for a user to manually determine the optimal performance settings for a particular preference, whereas the automatic settings on such software programs may not allow for user preferences to be considered. Such software programs also do not allow a user to access the experiences of other users to speed up and improve the optimization process.

Accordingly, there is a need for a software tool to better assist users in determining the best network configuration settings to achieve optimal network performance based on specified user preferences. The present invention fulfills such a need.

BRIEF SUMMARY OF THE INVENTION

The present invention is a method and system for optimizing network configuration settings for a user's client machine. A network connection between the client machine and a remote server is established. A plurality of network configuration settings are then selected for the client machine. One or more performance tests are automatically conducted using the selected network configuration settings. The selected network configuration settings of the client machine are automatically adjusted based on the results of the performance tests. The adjusted network configuration settings are settings that optimize the performance of the client machine.

The adjustments of the network configuration settings may be made through the use of an algorithm that performs statistical analysis on past network configuration setting performance test result data. Either regression or a polynomial curve fit may be used to perform the statistical analysis. The statistical analysis may be performed by either the client machine or the remote server.

A different predefined group of network configuration settings may be selected for each test performed. The user may specify, via the client machine, at least one network performance preference. Performance metric scoring may be executed on each of the different predefined groups of network configuration settings, based on a relative weight assigned to the network performance preference.

Logic running on the remote server may statistically analyze the results of the performance tests and determine one or more sets of network configuration settings for use on the client machine. The logic may include an intelligent optimization algorithm which uses historical performance data to statistically assess positive or negative scoring variations when a particular network configuration setting is adjusted. The adjustments of the network configuration settings may be made through the use of an algorithm that determines future groups of network configuration settings to test.

The network configuration performance of the client machine may be continually monitored, after the network configuration settings of the client machine are automatically adjusted. The monitored network configuration settings of the client machine may be automatically adjusted to maintain optimal network performance of the client machine. The user may select a set of default network configuration settings.

Network configuration settings and aggregate test results associated with other client machines that previously established a network connection with the remote server, may be stored on the remote server. The user's client machine may receive network configuration setting recommendations from the remote server, based on the network configuration settings and the aggregate test results stored on the remote server.

The network configuration settings may include latency, ping time, network connection stability, Maximum Transmission Unit (MTU), Maximum Segment Size (MSS), Receive Window (RWIN), Time To Live (TTL), Black Hole Detection, Auto Discovery of Path MTU, packet size, upload throughput speed and download throughput speed.

A percentage score may be assigned to each applicable network configuration setting. The relative weight of each network configuration setting may be multiplied by the percentage score for the network configuration setting. The relative weight may be determined as a function of the user's network performance preferences. The resulting products of the relative weights and the percentage scores may then be added to determine a weighted overall percentage score.

BRIEF DESCRIPTION OF THE SEVERAL VIEWS OF THE DRAWING

The following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 shows a database table structure for storing network configuration settings and performance metric test results in accordance with the present invention;

FIG. 4 shows an example of tests performed on a plurality of network configuration settings in accordance with the present invention;

FIG. 5 shows an example of determining scoring results of a network configuration setting in accordance with the present invention.

DETAILED DESCRIPTION OF THE INVENTION

To implement the present invention, a computer (hereinafter referred to as "client machine") that requires its network configuration settings to be optimized, is connected to a network. An application program (client software) running on a processor within the client machine performs a set of tests to determine optimal network configuration settings. In addition, the application program continuously monitors network performance and automatically adjusts the network configuration settings of the client machine to achieve and maintain optimal network performance in accordance with the user's specified preferences.

Figure 1:
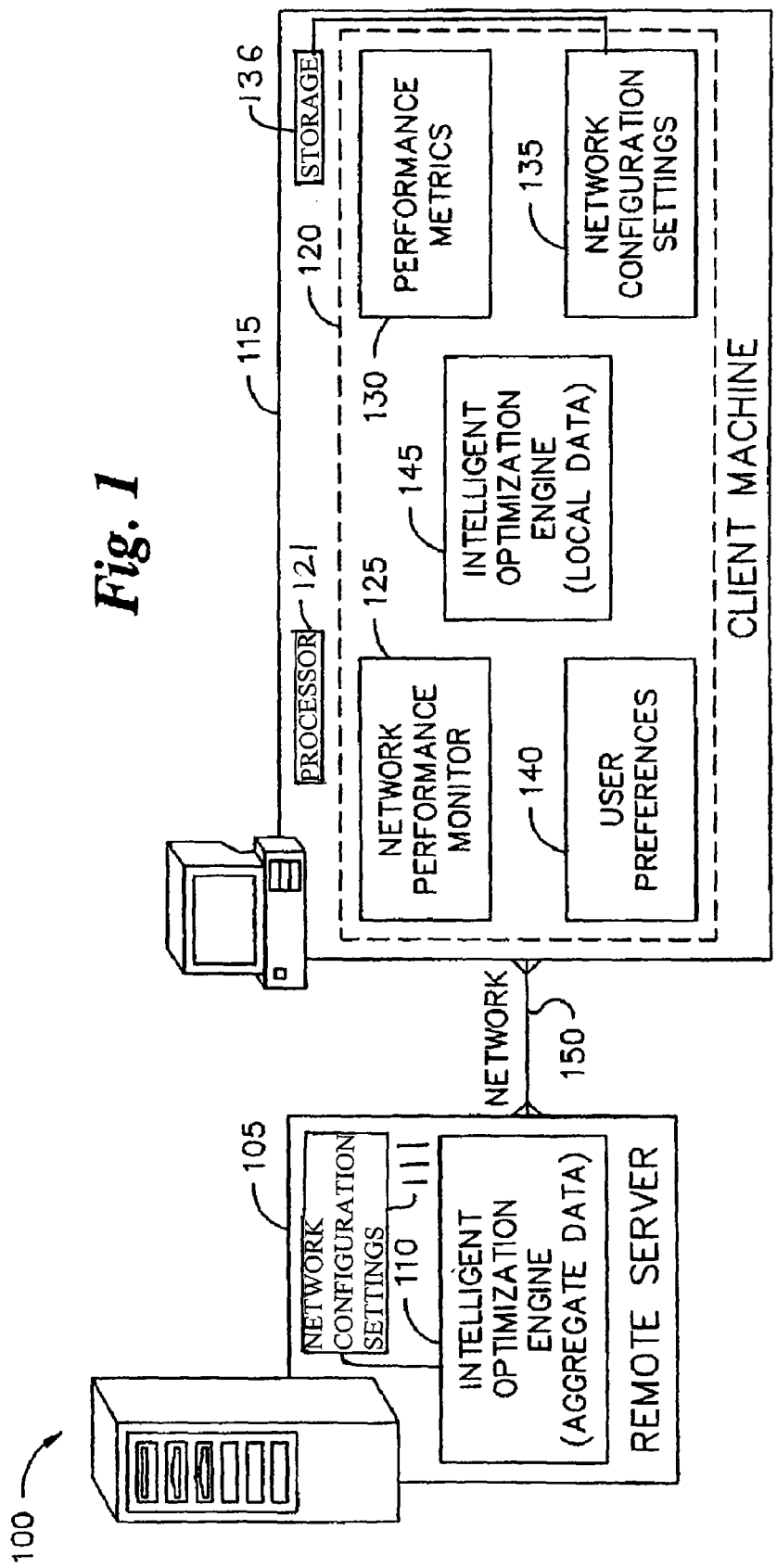
FIG. 1 shows a system block diagram configured in accordance with the present invention.

FIG. 1 shows a system 100 used to implement the present invention. The system 100 includes a remote server 105 with a remote network-enabled intelligent optimization engine 110, and a client machine 115 with an application program 120 running on a processor 121 within the client machine 115. The remote network-enabled intelligent optimization engine 110 may be a software object. The client machine 115 uses a network connection 150 to remote server 105 to test performance metrics based on various network configuration settings in order to achieve desired performance improvements. The remote network-enabled intelligent optimization engine 110 uses one or more algorithms to determine the best configuration based on the data accumulated in limited or ongoing performance tests. The application program 120 running on the processor 121 of the client machine 115 includes a network performance monitor 125, performance metrics 130, network configuration settings 135, user preferences 140 and a local intelligent optimization engine 145.

The network performance monitor 125 executes network performance tests in order to obtain performance metrics based on specific network configuration settings 135. As the performance metrics 130 are acquired for various network configuration settings 135, the network performance monitor 125 records the performance metrics on the client machine 115. The performance metrics are used by the local intelligent optimization engine 145 to achieve optimal network performance by determining the best network configuration settings 135 for the client machine 115 on a limited or ongoing basis according to one or more algorithms performed by the local intelligent optimization engine 145. Any appropriate performance metrics 130 may be used, including download throughput speed (measured in bytes received per second), upload throughput speed (measured in bytes transmitted per second), latency (measured in milliseconds of ping time), and stability (measured in the percentage of network data packets lost and/or retransmitted).

The client machine 115 uses the network performance monitor 125 to access the remote server 105. Data received over the network connection 150 from the remote server 105 is used to perform network performance tests in order to establish performance metrics. Additionally, the remote server 105 can optionally store network configuration settings and performance metrics received from one or more client machines using the remote network-enabled intelligent optimization engine 110. This data, either solely supplied by the client machine 115 or in aggregate form accumulated from many client machines over time, is used in algorithms based on the remote server 105, client machine 115, or both, to determine the best network configuration settings for the client machine 115 on a limited or ongoing basis. The remote server 105 may require an authentication protocol to grant access to the client machine 115.

The network configuration settings 135 on the client machine 115 determine the network configuration and behavior of the client machine 115. The local intelligent optimization engine 145 determines how the client software should adjust these settings in order to achieve optimal network performance in accordance with the specified user preferences 140 and algorithms in use by the client machine 115 and/or remote server 105. Any appropriate network configuration settings 135 which may affect the performance metrics 130 may be used, including, in the case of the Internet's TCP/IP protocol, Maximum Transmission Unit (MTU), Maximum Segment Size (MSS), Receive Window (RWIN), Time to Live (TTL), Black Hole Detection, and MTU Auto Discovery.

The user of the client machine 115 can set the user preferences 140 on the client machine 115. The local intelligent optimization engine 145 uses these user preferences 140 in order to determine the correct settings for optimal network performance. One optional user preference, the Scoring Bias, involves the relative weighting of various performance metrics 130 for determining ideal network performance characteristics in the Scoring Algorithm of the local intelligent optimization engine 145. In this example, using the performance metrics 130, one user may prefer a system with an enhanced download speed, while another may prefer a system with minimized latency. These users may set the Scoring Bias in relative favor of one or more of their preferred performance metrics 130 to achieve the desired network performance characteristics of their client machine. If the user does not set any user preferences 140, then the weightings of each of the performance metrics are made equal.

The local intelligent optimization engine 145 processes the performance metrics data 130 to determine the best network configuration settings 135 to achieve optimal network performance based on the specified user preferences 140 using one or more algorithms. If network performance is determined to be less than optimal based on the user preferences 140, with optional input from and/or control by the remote network-enabled intelligent optimization engine 110 according to the algorithm used, the local intelligent optimization engine 145 automatically adjusts the network configuration settings 135 of client machine 115 in order to enhance desired performance characteristics of the client machine 115.

The remote network-enabled intelligent optimization engine 110 on the remote server 105 is an optional component of the present invention. The remote network-enabled intelligent optimization engine 110 stores the network configuration settings 135 in storage 111 and aggregate test results from one or more users of one or more connected client machines 115. The local intelligent optimization engine 145 on the client machine 115 can access recommendations from the remote network-enabled intelligent optimization engine 110 on the remote server 105 in order to determine the optimal network configuration for that specific machine and network connection type.

The present invention stores performance metrics 130 for particular network configuration settings 135 on the client machine 115. The present invention accesses network configuration settings 135 stored in storage 136 on the client machine 115. In addition, the present invention can optionally store aggregate data received from one or more client machines 115 on the remote server 105. This data contains the network configuration settings 135 and network performance metric test results from the client machine(s) 115. Any other appropriately relevant data pertaining to the client machine 115, remote server 105, and the performance testing may be stored as well. FIG. 2 shows an example of how the specified data is stored in a database.

Figure 3:
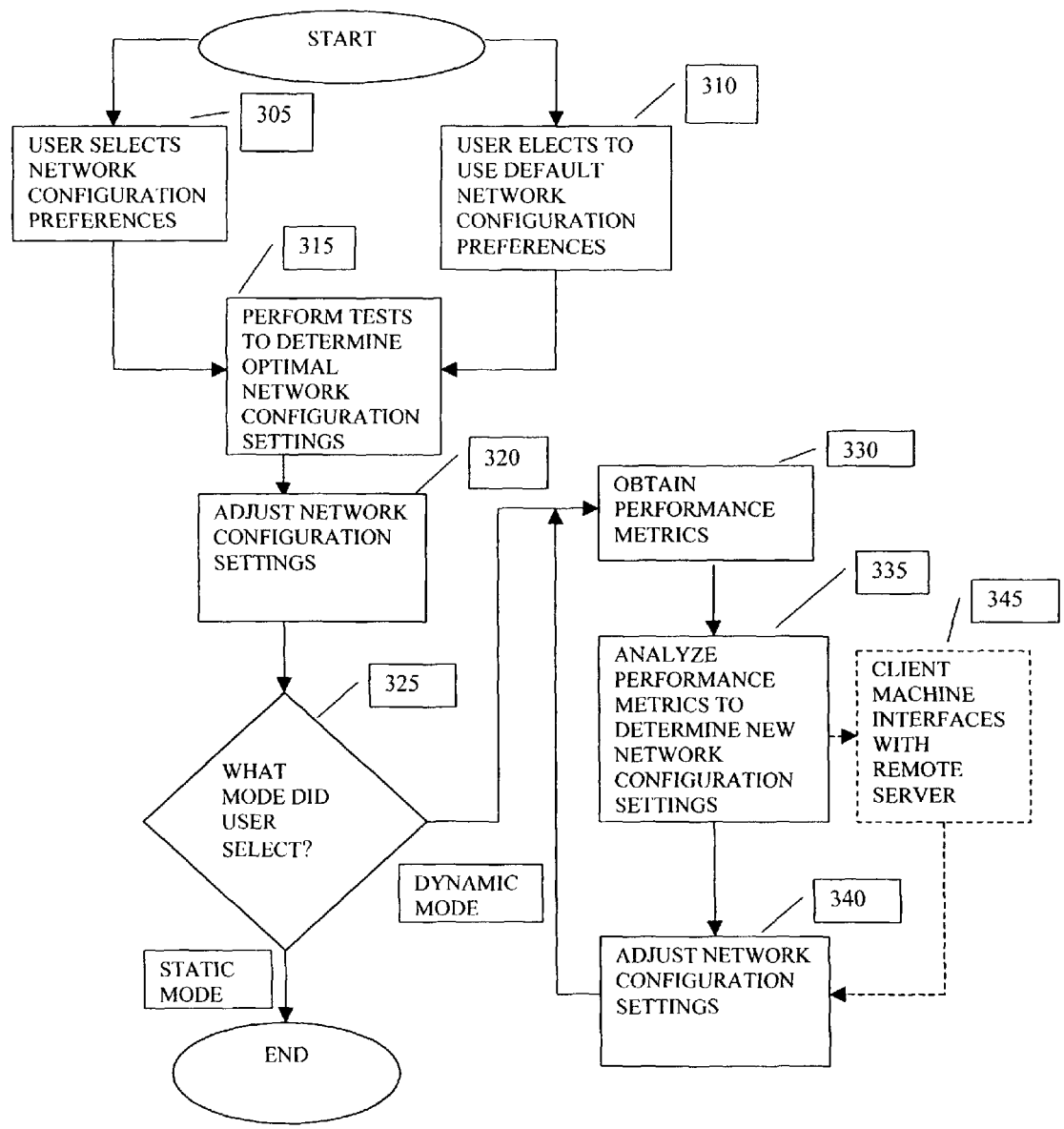
FIG. 3 shows a high-level flow chart illustrating a process of executing network performance tests in accordance with the present invention.

FIG. 3 shows a high-level functional flowchart that demonstrates the process of executing network performance tests to determine the most efficient network connectivity settings of the client machine. In step 305, the user selects network configuration setting preferences. Alternatively, in step 310, the user may elect to use default network configuration setting preferences using the software interface of the present invention. The monitoring/optimizing process may cease after a fixed number of iterations, or after maximum optimization benefits according to weighted score have been reached. In step 315, a multitude of tests are performed to determine the optimal network configuration settings for the client machine. In step 320, the network configuration settings are adjusted to maintain network optimization in accordance with the user preferences. In step 325, it is determined whether the user selected a static mode or a dynamic mode. If the user selected the static mode, the process for adjusting network configuration settings is terminated. If the user selected a dynamic mode, the network connectivity of the client machine is continuously monitored by implementing steps 330, 335, 340, and, optionally, step 345.

In step 330, the network performance monitor tests specific network configuration settings to obtain performance metrics. Using an appropriate algorithm, random or intelligent changes may be made to network configuration settings in order to anticipate optimal network performance. In step 335, the local intelligent optimization engine analyzes performance metrics and determines new network configuration settings to approach desired network performance. In step 340, the network configuration settings are again adjusted. Optionally, in step 345, the client machine may interface with the remote network-enabled intelligent optimization engine 110 on the remote server 105 in order to determine the optimal network configuration settings. When the dynamic mode is implemented, the network configuration settings are automatically adjusted on a continuous basis to maintain optimal network performance in accordance with the user preferences. After making these adjustments, network performance is continually monitored and adjusted on an "as needed" basis.

The intelligent optimization engine on the client machine or remote server may employ any number of appropriate algorithm(s), individually or in conjunction with one another, to determine the best network configuration settings and achieve the desired network performance characteristics for the client machine based on specified user preferences. The algorithms on the client machine and remote server may communicate using an appropriate network application protocol. The algorithms may be designed to use certain data to achieve desired performance characteristics for a particular network connection type, such as dial-up modem, ISDN, ADSL, cable modem, and T-1. The exemplary algorithms described below may use results of the Scoring Formula as data points for determining the desired network connection characteristics.

The scoring method implemented by the present invention evaluates the results of past tests of groups of network configuration settings. If the user specifies a scoring preference (such as faster downloads or reduced ping times), the results for each group of network configuration settings are weighted.

In accordance with the present invention, future groups of network configuration settings to test are determined by either using a predetermined test sequence supplied locally in a client program running on client machine 115, or via the remote server 105. Alternatively, a statistical analysis method invention, such as linear regression or polynomial curve fit, may be implemented in accordance with the present invention to statistically analyze past results. The use of statistical analysis can decrease the time it takes to find optimal groups of settings. For example, a curve fit or regression may indicate that increasing packet size causes a desired performance characteristic specified by the user, such as the download speed of client machine 115, to increase. Based on the statistical analysis, it would no longer be necessary to test smaller packet sizes. This would significantly save time on testing and allows the optimum network configuration settings to be determined more expeditiously.

In order to avoid obtrusive interference in the end-user's network activity, the active testing of performance metrics by the network performance monitor may be delayed by the local intelligent optimization engine to times when network activity is idle or reduced. In cases where the network connection of the client machine is a limiting factor in performance results, the network performance monitor may automatically suspend the network activity of other network applications on the client machine, or provide a warning message for the end user to suspend network activity of other network applications.

The Scoring Formula merges the performance metrics test results for particular network configuration settings with the user preferences to assist the calling algorithm in achieving user-desired performance characteristics. For each set of network configuration settings, each applicable performance metric is assigned a percentage score relative to the best performing set of network configuration settings for that particular metric. For metrics where a larger number is desired (such as download throughput), the percentage score of a designated metric of a particular set of network configuration settings is calculated by dividing the designated metric by the best result of the designated metric for all tested sets of network configuration settings, and multiplying by 100. For metrics where a smaller number is desired, the metric percentage score of the set is calculated by taking the inverse of the above example. To avoid divide-by-zero errors in this case, if one or more scores of a metric are equal to "0", the percentage score for that metric is automatically set to 100%, the best possible percentage score for a metric.

For each set of network configuration settings, a weighted overall percentage score is determined. The relative weight of each performance metric, specified as a percentage by the user preferences, is multiplied by the percentage score for that particular metric. Each of these results are then added together to achieve the weighted overall percentage score. The weighted overall percentage scores are returned to the calling algorithm.

A Local Source version of an Active-Learning Algorithm of the local intelligent optimization engine is designed to determine a baseline for the desired network performance characteristics on the client machine. Using a series of performance tests, performance metrics are obtained and stored on the client machine. The network performance monitor performs these tests with a selected set of network configuration settings in order to record accurate performance metrics. In the Local Source version of the Active-Learning Algorithm, sets of network configuration settings are determined for a variety of network connection types at design time and hard-coded into the client software. The local intelligent optimization engine instructs the network performance monitor to capture performance metrics for each set of network configuration settings. After the initial round of tests has been completed, the local intelligent optimization engine passes the results sets to the Scoring Formula. The Scoring Formula returns a weighted percentage score for each set of network configuration settings. The local intelligent optimization engine then selects the highest scoring set of network configuration settings as a baseline for the desired network performance characteristics.

FIG. 4 shows an example of tests being performed on five groups of network configuration settings, G1 through G5. The lowest (best) ping time receives a score of 100%, and the highest (best) throughput receives a score of 100%, and the other results are scored relatively. The Scoring Bias is neutral, so the scores for each group are averaged to determine the weighted overall percentage score. The Active-Learning Algorithm has determined that G1, with the best-weighted overall percentage score, is the best group of network configuration settings in this scenario. The Local Source version of the Active-Learning Algorithm or others may be used to further pinpoint an optimal group of network configuration settings.

In a Network Source version of the Active-Learning Algorithm, the sets of network configuration settings are provided by the remote server at run time based on the network connection type of the client machine. The remote server makes the selection based on the Active-Learning Support Algorithm in use at the time. Other than gathering the sets of network configuration settings from the remote server instead of the client software, the Network Source version of the Active-Learning Algorithm initially proceeds exactly as in the Local Source version of the Active-Learning Algorithm. After the testing round has been completed and the Scoring Formula is called to provide a weighted percentage score for each set of network configuration settings, the client machine provides the remote server with the result set. The remote server stores the percentage score results for various network configuration settings for one or more machines and may use the stored results to determine the set of network configuration settings to provide to client machine(s) in the future.

In a Preset version of the Active-Learning Support Algorithm, the responsibility of the remote server is to provide a set of network configuration settings to a client machine. More specifically, sets of network configuration settings appropriate to particular network connection types, predetermined at design time and hard-coded into the remote server, are provided to the client machine. The sets may be manually changed at any time, but are not altered based on results from client machines.

In an Intelligent version of the Active-Learning Support Algorithm, the weighted percentage scores for network configuration sets supplied by client machine(s) in a prior session for a particular connection type are used as aggregate data. The Active-Learning Support Algorithm on the remote server uses the aggregate data to determine sets of network configuration settings for a particular network connection type on a client machine. In the Intelligent version of the Active-Learning Support Algorithm, the client machine requests the remote server to provide sets of network configuration settings for a particular network connection type. The Intelligent version of the Active-Learning Support Algorithm searches the database of past results for that connection type to provide a representative range of network configuration settings that have achieved a particular threshold weighted percentage score by the Scoring Formula, such as 90%.

Using the Local Decision version of the Intelligent Optimization Algorithm, the local intelligent optimization engine provides ongoing performance enhancement to achieve the desired characteristics as specified in the user preferences. The Local Decision version of the Intelligent Optimization Algorithm uses historical performance data, i.e., the performance metrics, to statistically assess the positive or negative scoring variation when the local intelligent optimization engine adjusts a particular network configuration setting. The Local Decision version of the Intelligent Optimization Algorithm begins with two or more starting sets of network configuration settings, which can be supplied locally or over the network as in the Active-Learning Algorithm. A large enough set must be supplied to give statistical significance to the resulting effect on the performance metrics by a particular network configuration setting variable. As in any statistical analysis, the more variables, i.e., network configuration settings, are present, the more test data, i.e., performance metrics based on sets of network configuration settings, must be supplied to determine the effect of any one variable on the test results.

Once the initial data set is gathered, an appropriate statistical analysis method is employed, such as linear regression or polynomial curve fit, for the performance metric scoring based on each network configuration setting. The statistical analysis determines a predicted maximum range for the scoring results for a particular network configuration setting.

FIG. 5 shows scoring results for an exemplary network configuration setting based on various values of Maximum Transmission Unit (MTU). In this example, a statistical analysis determines the best packet size between 1576 and 2560 octets (eight-bit bytes). The local intelligent optimization engine using the Local Decision version of the Intelligent Optimization Algorithm might suggest several sets of network configuration settings including packet size between 1576 and 2560 octets. Standard multivariable analysis techniques can be used in the Local Decision version of the Intelligent Optimization Algorithm for analyzing results sets of tests on multiple network configuration settings. The analysis would supply similar confidence range results as the above MTU example, i.e., several more sets of network configuration settings on which to perform scoring and analysis. An iteration of the Local Decision version of the Intelligent Optimization Algorithm is completed when one or more new sets of network configuration settings are supplied to the local intelligent optimization engine for further testing. Whether one or multiple network configuration settings are under analysis by the Local Decision version of the Intelligent Optimization Algorithm, the local intelligent optimization engine continuously uses this algorithm to analyze the performance metrics results of sets of network configuration settings and provide new sets of network configuration settings to analyze. Multiple iterations of the Local Decision version of the Intelligent Optimization Algorithm, over time, achieves the best performance characteristics specified by the user preferences.

In a Network Decision version of the Intelligent Optimization Algorithm on the client machine, the statistical analyses of performance metrics recorded by the network performance monitor for particular sets of network configuration settings are performed by the remote network-enabled intelligent optimization engine on the remote server. The remote server may optionally use aggregate data from other client machines, if present, as additional data points in the linear regression, polynomial curve fit, or other statistical analytical method in use by the remote network-enabled intelligent optimization engine.

An iteration of Network Decision version of the Intelligent Optimization Algorithm begins with the client machine opening a network connection to the remote server. If available, the client machine supplies test results from the network performance monitor for one or more sets of network configuration settings to the remote network-enabled intelligent optimization engine on the remote server. Optionally, the remote server stores this data. The remote server, using the Intelligent Optimization Support Algorithm, performs a statistical analysis similar to that described in the Local Decision version of the Intelligent Optimization Algorithm. However, the remote server may optionally use aggregate test results data stored from sessions with this and/or other client machines using similar network connection types to determine the impact of a particular network configuration setting on the scoring results. To complete the iteration of the Local Decision version of the Intelligent Optimization Algorithm, the remote network-enabled intelligent optimization engine supplies one or more sets of network configuration settings for further testing as described in the Intelligent Optimization Support Algorithm. The local intelligent optimization engine then directs the network performance monitor to test the supplied set(s) of network configuration settings and optionally repeats an iteration of the Local Decision version of the Intelligent Optimization Algorithm to refine the network performance characteristics.

In an Intelligent Optimization Support Algorithm, the remote server fulfills its obligation to the client machine in the Network Decision version of the Intelligent Optimization Algorithm to statistically analyze the test results and determine one or more sets of network configuration settings for use on the client machine. This Intelligent Optimization Support Algorithm functions as described in the Network Decision version of the Intelligent Optimization Algorithm. The Intelligent Optimization Support Algorithm begins by receiving performance metrics results for tests performed by the network performance monitor on the client machine, and a statistical analysis is performed on those results, optionally combined with past results of tests on the client machine and/or other client machines. The Intelligent Optimization Support Algorithm stores test results supplied by the client machine and ends by returning sets of network configuration settings which are likely to maximize the performance score according to an applicable statistical analysis, such as single-variable or multivariable regression or curve fitting.

Figure 6:
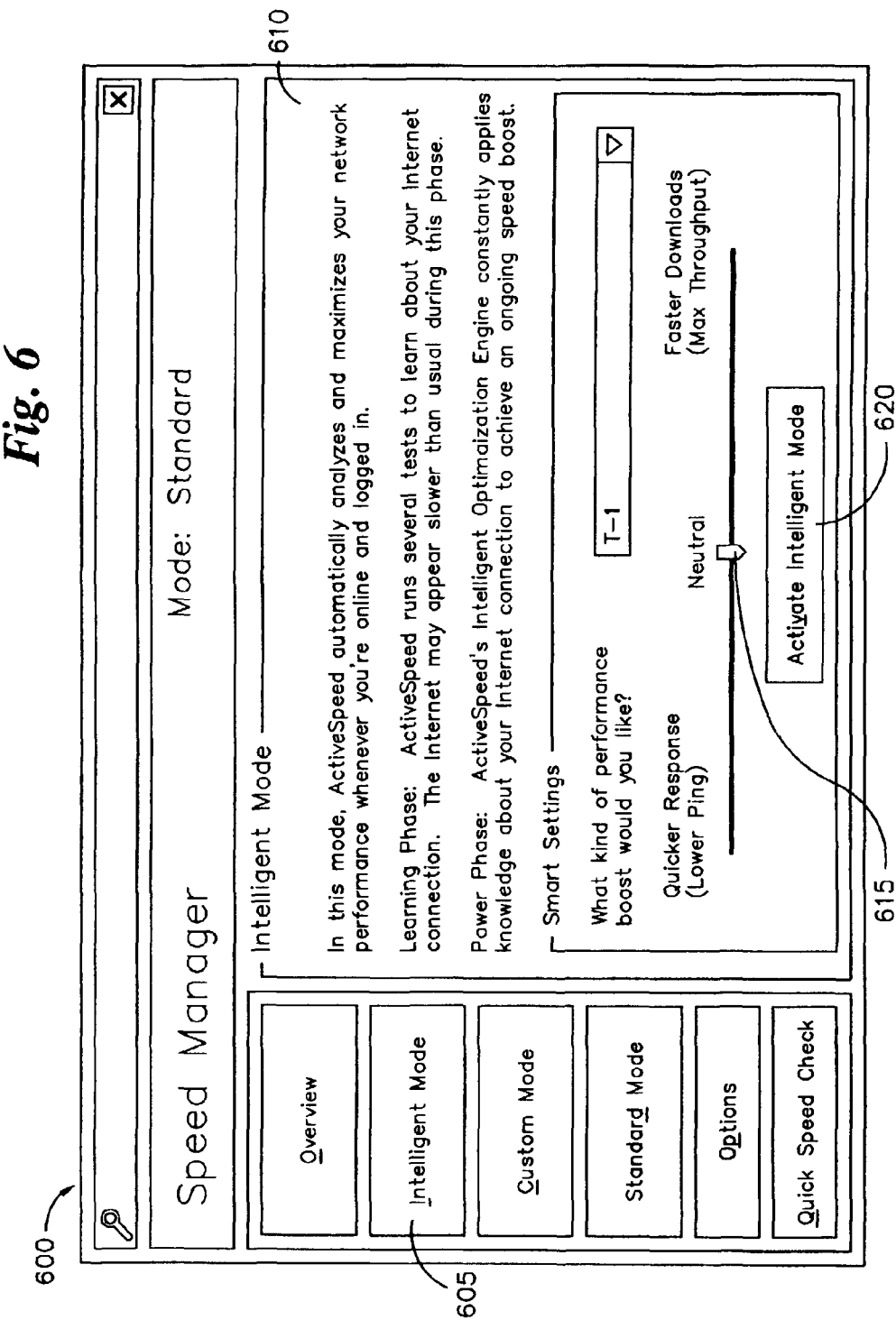
FIG. 6 shows an example of a user interface used in accordance with the present invention.

FIG. 6 shows a Speed Manager user interface 600 in accordance with one embodiment of the present invention. The Speed Manager user interface 600 allows users to select network configuration preferences. To access the features, the user selects an Intelligent Mode menu button 605 and information about this mode is displayed in an Intelligent Mode console 610 of Speed Manager 600. In this implementation, a Scoring Bias selector 615 may be adjusted to balance between quicker response (lower ping/latency) and faster downloads (maximum throughput). The network configuration settings of the client machine are optimized in the Intelligent Mode. Activation of an Intelligent Mode activation button 620 executes a series of network performance tests in order to obtain performance metrics for the client machine.

The present invention provides further functionality to the user. This functionality includes a graphical interface displaying current network performance, a graphical interface displaying current status of the local intelligent optimization engine, an authentication protocol to access the remote server for performance testing and, optionally, the ability to compare client machine network configuration settings and performance metrics with recommendations provided by the remote network-enabled intelligent optimization engine using an appropriate decision-making algorithm on the client machine or remote network-enabled intelligent optimization engine. Additionally, a user of the present invention may take advantage of the collective, accumulated knowledge of other users who have completed a similar optimization process.

The present invention is capable of running on any hardware configuration that is used as part of today's technology. In order to actively monitor network performance, the client software must be able to connect to another computer (e.g., the remote server) via the Internet.

The present invention may be used with any computer operating system. However, in today's modem marketplace, Microsoft Windows is the most commonly used computer operating system. The present invention may be used with Windows 95, Windows 98, Windows Me, Windows NT, Windows 2000 and Windows XP. The present invention supports future Windows based operating systems.

When implementing the present invention using Windows operating systems, the Internet connection of the user's client machine is tested each time that the user's client machine boots up, over a period of time which may be referred to as a "learning phase." During each test, a different group of network configuration settings are selected and remain fixed during the Internet session. A user must reboot his or her client machine, reconnect to the Internet, and then login to the remote server several times until the learning phase is complete. Ideally, the operating system allows all of the different groups of network configuration settings to be tested at one time so that the optimal settings may be determined and set without having to reboot the client machine or reconnect to the Internet.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of optimizing network configuration settings for a user's client machine, the method comprising:

(a) providing a plurality of groups of network configuration settings to be used by the user's client machine;

(b) establishing a network connection between the user's client machine and a remote server;

(c) selecting one of the groups of network configuration settings to be used by the user's client machine from the provided groups of settings, wherein step (c) is initiated on the user's client machine;

(d) automatically conducting one or more performance tests using the selected network configuration settings during the established network connection;

(e) repeating steps (c) and (d) for one or more other groups of network configuration settings during the established network connection; and (f) automatically adjusting the network configuration settings of the user's client machine provided in the groups based on the results of the performance tests, wherein the adjusted network configuration settings are settings that optimize the performance of the user's client machine.

2. The method of claim 1 wherein the adjustments of the network configuration settings are made through the use of an algorithm that performs statistical analysis on past network configuration setting performance test result data.

3. The method of claim 2 wherein regression is used to perform the statistical analysis.

4. The method of claim 2 wherein a polynomial curve fit is used to perform the statistical analysis.

5. The method of claim 2 wherein the statistical analysis is performed by the client machine.

6. The method of claim 2 wherein the statistical analysis is performed by the remote server.

7. The method of claim 1 further comprising:

(g) the user specifying, via the client machine, at least one network performance preference; and (h) executing performance metric scoring on each of the different provided groups of network configuration settings, based on a relative weight assigned to the network performance preference.

8. The method of claim 1 wherein logic running on the remote server statistically analyzes the results of the performance tests and determines one or more groups of network configuration settings for use on the client machine.

9. The method of claim 8 wherein the logic includes an intelligent optimization algorithm which uses historical performance data to statistically assess positive or negative scoring variations when a particular network configuration setting is adjusted.

10. The method of claim 1 wherein the adjustments of the network configuration settings are made through the use of an algorithm that determines future groups of network configuration settings to test.

11. The method of claim 1 further comprising:

(g) continually monitoring the network configuration performance of the client machine, after step (f) has been performed; and (h) automatically adjusting the monitored network configuration settings of the client machine to maintain optimal network performance of the client machine.

12. The method of claim 1 further comprising:

(g) storing on the remote server, groups of network configuration settings and aggregate test results associated with other client machines that previously established a network connection with the remote server; and (h) the user's client machine receiving groups of network configuration setting recommendations from the remote server based on the groups of network configuration settings and the aggregate test results stored on the remote server.

13. The method of claim 1 wherein one of the network configuration settings is latency.

14. The method of claim 1 wherein one of the network configuration settings is ping time.

15. The method of claim 1 wherein one of the network configuration settings is network connection stability.

16. The method of claim 1 wherein one of the network configuration settings is Maximum Transmission Unit (MTU).

17. The method of claim 1 wherein one of the network configuration settings is Maximum Segment Size (MSS).

18. The method of claim 1 wherein one of the network configuration settings is Receive Window (RWIN).

19. The method of claim 1 wherein one of the network configuration settings is Time To Live (TTL).

20. The method of claim 1 wherein one of the network configuration settings is Black Hole Detection.

21. The method of claim 1 wherein one of the network configuration settings is Auto Discovery of Path Maximum Transmission Unit (MTU).

22. The method of claim 1 wherein one of the network configuration settings is packet size.

23. The method of claim 1 wherein one of the network configuration settings is upload throughput speed.

24. The method of claim 1 wherein one of the network configuration settings is download throughput speed.

25. The method of claim 1 further comprising:

(g) assigning a percentage score to each applicable network configuration setting;

(h) multiplying the relative weight of each network configuration setting by the percentage score for the network configuration setting, wherein the relative weight is determined as a function of the user's network performance preferences; and (i) adding the resulting products of step (h) to determine a weighted overall percentage score.

26. The method of claim 1 wherein step (c) further comprises:

(c)(i) the user selecting a group of default network configuration settings.

27. The method of claim 1 further comprising:

(g) storing the plurality of groups of network configuration settings in a storage location, wherein step (c) further comprises selecting one of the groups of network configuration settings for the client machine from the storage location.

28. The method of claim 1 wherein step (a) is performed by determining a plurality of groups of network configuration settings to be used by the user's client machine, wherein the determined settings are the provided settings.

29. An article of manufacture for optimizing network configuration settings for a user's client machine, the article of manufacture comprising a non-transitory computer-readable medium, wherein the computer-readable medium comprises computer-readable program code for performing a method comprising:

(a) providing a plurality of groups of network configuration settings held in storage to be used by the user's client machine;

(b) establishing a network connection between the user's client machine and a remote server;

(c) selecting one of the groups of network configuration settings to be used by the user's client machine from the provided groups of settings, wherein step (c) is initiated on the user's client machine;

(d) automatically conducting, using a processor, one or more performance tests using the selected network configuration settings during the established network connection;

(e) repeating steps (c) and (d) for one or more other groups of network configuration settings during the established network connection; and (f) automatically adjusting, using the processor, the network configuration settings of the user's client machine provided in the groups based on the results of the performance tests, wherein the adjusted network configuration settings are settings that optimize the performance of the user's client machine.

30. The article of manufacture of claim 29 wherein the adjustments of the network configuration settings are made through the use of an algorithm that performs statistical analysis on past network configuration setting performance test result data.

31. The article of manufacture of claim 30 wherein regression is used to perform the statistical analysis.

32. The article of manufacture of claim 30 wherein a polynomial curve fit is used to perform the statistical analysis.

33. The article of manufacture of claim 30 wherein the statistical analysis is performed by the client machine.

34. The article of manufacture of claim 30 wherein the statistical analysis is performed by the remote server.

35. The article of manufacture of claim 29 wherein the computer readable program code performs a method further comprising:

(e) the user specifying, via the client machine, at least one network performance preference; and (f) executing performance metric scoring on each of the different provided groups of network configuration settings, based on a relative weight assigned to the network performance preference.

36. The article of manufacture of claim 29 wherein logic running on the remote server statistically analyzes the results of the performance tests and determines one or more groups of network configuration settings for use on the client machine.

37. The article of manufacture of claim 36 wherein the logic includes an intelligent optimization algorithm which uses historical performance data to statistically assess positive or negative scoring variations when a particular network configuration setting is adjusted.

38. The article of manufacture of claim 29 wherein the adjustments of the network configuration settings are made through the use of an algorithm that determines future groups of network configuration settings to test.

39. The article of manufacture of claim 29 wherein the computer readable program code performs a method further comprising:

(g) continually monitoring the network configuration performance of the client machine, after step (f) has been performed; and (h) automatically adjusting the monitored network configuration settings of the client machine to maintain optimal network performance of the client machine.

40. The article of manufacture of claim 29 wherein the computer readable program code performs a method further comprising:

(g) storing on the remote server, groups of network configuration settings and aggregate test results associated with other client machines that previously established a network connection with the remote server; and (h) the user's client machine receiving groups of network configuration setting recommendations from the remote server based on the groups of network configuration settings and the aggregate test results stored on the remote server.

41. The article of manufacture of claim 29 wherein one of the network configuration settings is latency.

42. The article of manufacture of claim 29 wherein one of the network configuration settings is ping time.

43. The article of manufacture of claim 29 wherein one of the network configuration settings is network connection stability.

44. The article of manufacture of claim 29 wherein one of the network configuration settings is Maximum Transmission Unit (MTU).

45. The article of manufacture of claim 29 wherein one of the network configuration settings is Maximum Segment Size (MSS).

46. The article of manufacture of claim 29 wherein one of the network configuration settings is Receive Window (RWIN).

47. The article of manufacture of claim 29 wherein one of the network configuration settings is Time To Live (TTL).

48. The article of manufacture of claim 29 wherein one of the network configuration settings is Black Hole Detection.

49. The article of manufacture of claim 29 wherein one of the network configuration settings is Auto Discovery of Path Maximum Transmission Unit (MTU).

50. The article of manufacture of claim 29 wherein one of the network configuration settings is packet size.

51. The article of manufacture of claim 29 wherein one of the network configuration settings is upload throughput speed.

52. The article of manufacture of claim 29 wherein one of the network configuration settings is download throughput speed.

53. The article of manufacture of claim 34 wherein the computer readable program code performs a method further comprising:

(g) assigning a percentage score to each applicable network configuration setting;

(h) multiplying the relative weight of each network configuration setting by the percentage score for the network configuration setting, wherein the relative weight is determined as a function of the user's network performance preferences; and (i) adding the resulting products of step (h) to determine a weighted overall percentage score.

54. The article of manufacture of claim 29 wherein step (c) further comprises:

(c)(i) the user selecting a group of default network configuration settings.

55. The article of manufacture of claim 29 wherein the computer readable program code performs a method further comprising:

(g) storing the plurality of groups of network configuration settings in a storage location, wherein step (c) further comprises selecting one of the groups of network configuration settings for the client machine from the storage location.

56. The article of manufacture of claim 29 wherein step (a) is performed by determining a plurality of groups of network configuration settings to be used by the user's client machine, wherein the determined settings are the provided settings.

* * * * *